(12) United States Patent
Shah (10) Patent No.: US 6,498,694 B1
(45) Date of Patent: Dec. 24, 2002

(54) SERVO ERROR INTEGRATION IN READ-CHANNEL EQUALIZATION

(75) Inventor: Sunil C. Shah, Los Altos, CA (US)

(73) Assignee: Voyan Technology, Santa Clara, CA (US)

( * ) Notice: Subject to any disclaimer, the term of this patent is extended or adjusted under 35 U.S.C. 154(b) by 16 days.

(21) Appl. No.: 09/596,428

(22) Filed: Jun. 15, 2000

Related U.S. Application Data (60) Provisional application No. 60/139,350, filed on Jun. 15, 1999.

(51) Int. Cl.[7] .................................................. G11B 5/09
(52) U.S. Cl. ............................ 360/46; 360/53; 360/65; 360/77.02; 360/78.04
(58) Field of Search ................................ 375/229, 230, 375/232, 346; 360/53, 65, 46, 77.02, 77.08, 78.04, 78.09

(56) References Cited

U.S. PATENT DOCUMENTS

| | | | |
|---|---|---|---|
| 4,562,495 A | * 12/1985 | Bond et al. | |
| 5,450,253 A | * 9/1995 | Seki et al. | ................... 360/65 |
| 5,668,678 A | * 9/1997 | Reed et al. | ................... 360/51 |
| 5,825,318 A | * 10/1998 | Patapoutian et al. | ........ 341/131 |
| 5,880,959 A | 3/1999 | Shah et al. | |
| 5,991,525 A | 11/1999 | Shah et al. | |
| 6,041,172 A | 3/2000 | Shah et al. | |
| 6,163,421 A | * 12/2000 | Shinpuku et al. | ............. 360/46 |
| 6,204,787 B1 | * 3/2001 | Baird | ......................... 341/139 |

OTHER PUBLICATIONS

John G. Proakis, "Equalization Techniques for High–Density Magnetic Recording", Methods for Fighting Interference During Readback in Digital Magnetic Disk Systems, IEEE Signal Processing Magazine, for the Record Advances in Algorithms for Magnetic and Optical Digital Recording, Jul. 1998, vol. 15, No. 4 ISSN 1053–5888, pp. 81–82.

Jackyun Moon, "The Role of SP in Data–Storage", IEEE Signal Processing Magazine, for the Record Advances in Algorithms for Magnetic and Optical Digital Recording, Jul. 1998, vol. 15, No. 4 ISSN 1053–5888, pp. 54–72.

* cited by examiner

*Primary Examiner*—Alan T. Faber
(74) *Attorney, Agent, or Firm*—Blakely, Sokoloff, Taylor & Zafman LLP (57) ABSTRACT

A method and system for servo error integration in read-channel equalization are described. In the present invention servo error is integrated into an equalizer. Also described in the present invention are methods and systems for determining the servo error.

11 Claims, 7 Drawing Sheets

SERVO ERROR INTEGRATION IN READ-CHANNEL EQUALIZATION

REFERENCE TO RELATED APPLICATIONS

This application claims the benefit of U.S. Provisional Application No. 60/139,350, filed on Jun. 15, 1999, titled "Read Channel and Servo Integration."

BACKGROUND OF THE INVENTION

1. Field of the Invention

The present invention relates to read-channel signal processing in media storage systems. More particularly, the present invention relates to a method and system for improved read-channel equalization through integration of servo information.

2. Description of Related Art

Data/media storage systems such as hard disk drives (HDDs), compact disks (CDs and CD-ROMs), digital video disks (DVDs), magneto-optical disks, etc., read and write data using magnetic or optical transfer techniques. In the case of magnetic media the process of reading the data involves measuring the magnetic field generated by the recorded data. In the optical media case the process of reading the data involves measuring the optical reflection properties of the recorded data as the data is lit by a laser beam.

Regardless of the technology used to read the data, once the data is read the measured signal is converted into an electrical signal (read signal). The electrical/read signal is then processed to infer the value of the data that was read (detected symbols). This is referred to as read-channel signal processing.

Figure 1:
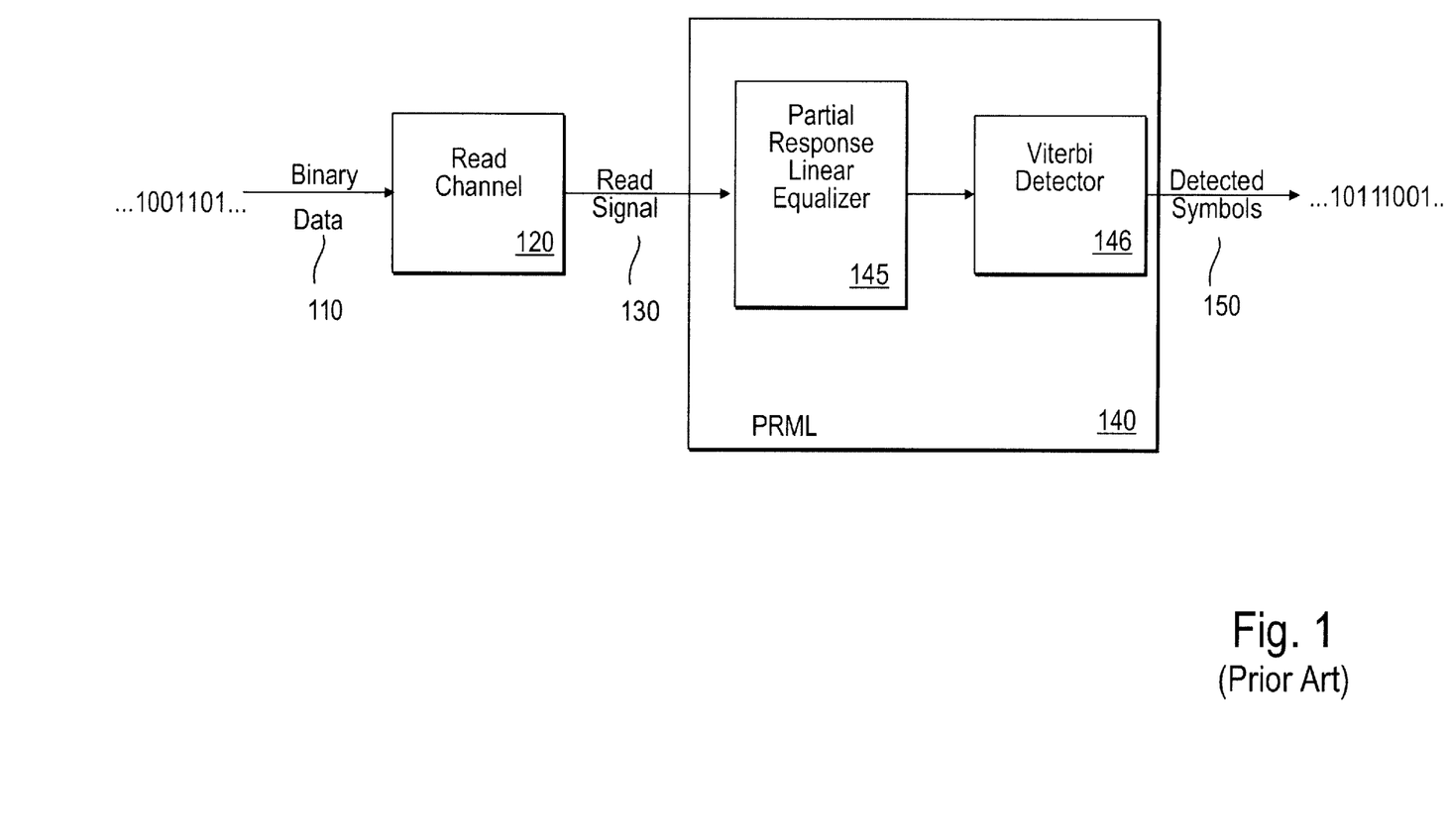
FIG. 1 illustrates a prior art read channel signal processing procedure.

FIG. 1 illustrates a prior art read channel signal processing procedure. Data is stored in the media storage system as binary data 110. The data is accessed using either the magnetic or optical media processes. In FIG. 1, read-channel 120 represents the modulation process where the magnetic or optical flux is written on the medium and the magnetic or optical signal is measured. The read-channel 120 also represents the conversion of the measured magnetic or optical signal into a filtered and sampled electrical signal referred to herein as the read signal 130.

Next, the read signal 130 is processed to infer the value of the data that was read i.e., detected symbols 150. The read-channel processing scheme illustrated in FIG. 1 for inferring the value of the data that was read to arrive at the detected symbols 150 is referred to as Partial Response Maximum Likelihood (PRML) detection 140. PRML detection 140 incorporates a linear partial response equalizer 145 followed by a Viterbi detector 146. Other prior art methods for read-channel processing include Decision Feedback Equalizer (DFE) and Finite Delay Tree Search (FDTS). Such read-channel processes work in similar fashion to the PRML processes and are not discussed in detail herein.

Such read-channel signal processing systems suffer from Inter Symbol Interference (ISI) and noise that makes it difficult for the system to detect each written symbol. Thus, the read-channel processing systems have a corresponding error rate associated with the fact that the detected symbols 150 do not always match the values of the binary data 110 that was written. To decrease the error rate associated with read channel signal processing systems, such systems use models of the read channel to model the dynamic relationship between the actual value of the recorded data and the corresponding measured value of the electrical signal (read signal). The accuracy of these models greatly influences the Bit Error Rate (BER) of the read process. The BER is the ratio of the number of data bits whose inferred value was incorrect over the total number of data bits that were read and processed.

Figure 2:
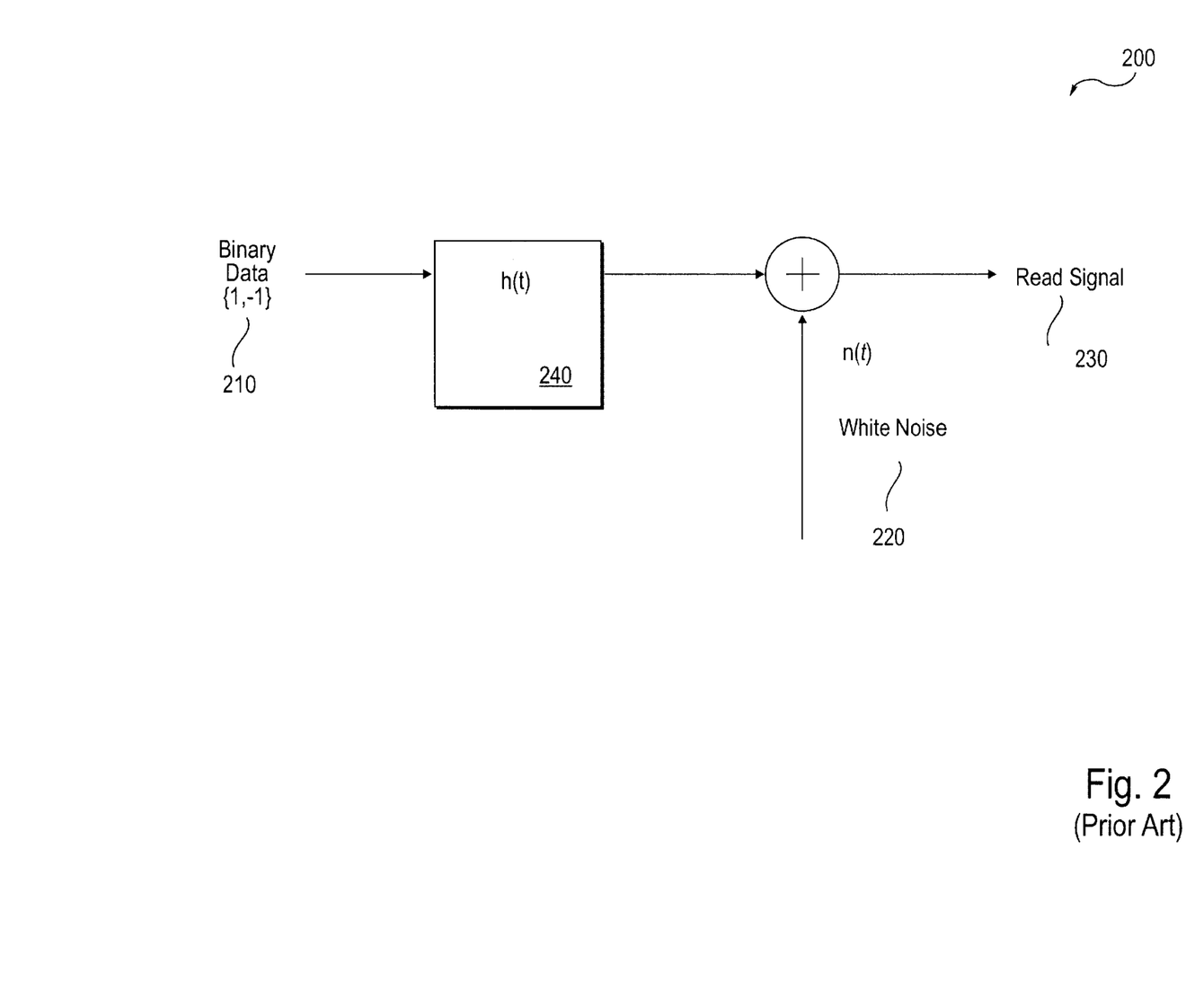
FIG. 2 illustrates a model used in prior art read-channel processing systems.

FIG. 2 illustrates a model used in prior art read-channel processing systems. Read channel model (model) 200 typically is a linear model 240 with additive white noise 220. The concepts and processes of modeling are known in the art and are not discussed in detail herein. Model 200 and the processes of model 200 would be used within the read channel 120 illustrated in FIG. 1. In FIG. 2, model 200 represents the assumption that the read signal 230 is produced by passing the binary data 210 through a linear filter 240 and then adding white noise 220.

In prior art media storage systems read-channel signal processing is performed separately from servo processing. Consequently, in prior art read-channel signal processing the only source of error considered is the additive white noise discussed above. By separating the read-channel signal processing from servo processing, the read-channel equalization does not take into account the servo error of the read-head (i.e., actuator head) during processing of the read data. The servo error is the error between the actual position of the head and the desired position of the head on the media storage device. As track pitch is reduced to increase density, the tracking (or position) errors become a significant portion of the track pitch. In systems with reduced track pitch, during real-time operation the actual value of the servo error fluctuates widely due to controller design limitations and external disturbances. The position of the actuator head during a read and/or write operation will affect the value of the data read and/or written.

The positioning and motion of the magnetic or optical heads that read and/or write the data are controlled using sophisticated feedforward and feedback control methods (control methods). The main objective of these control methods is to minimize the servo error and improve the data access time of the system. The servo error, as stated earlier, is the error between the actual position of the head and the desired position of the head on the media storage device. The data access time is the amount of time that passes from the moment the command for reading and/or writing the data is issued to the moment that the data is actually read and/or written.

Figure 3:
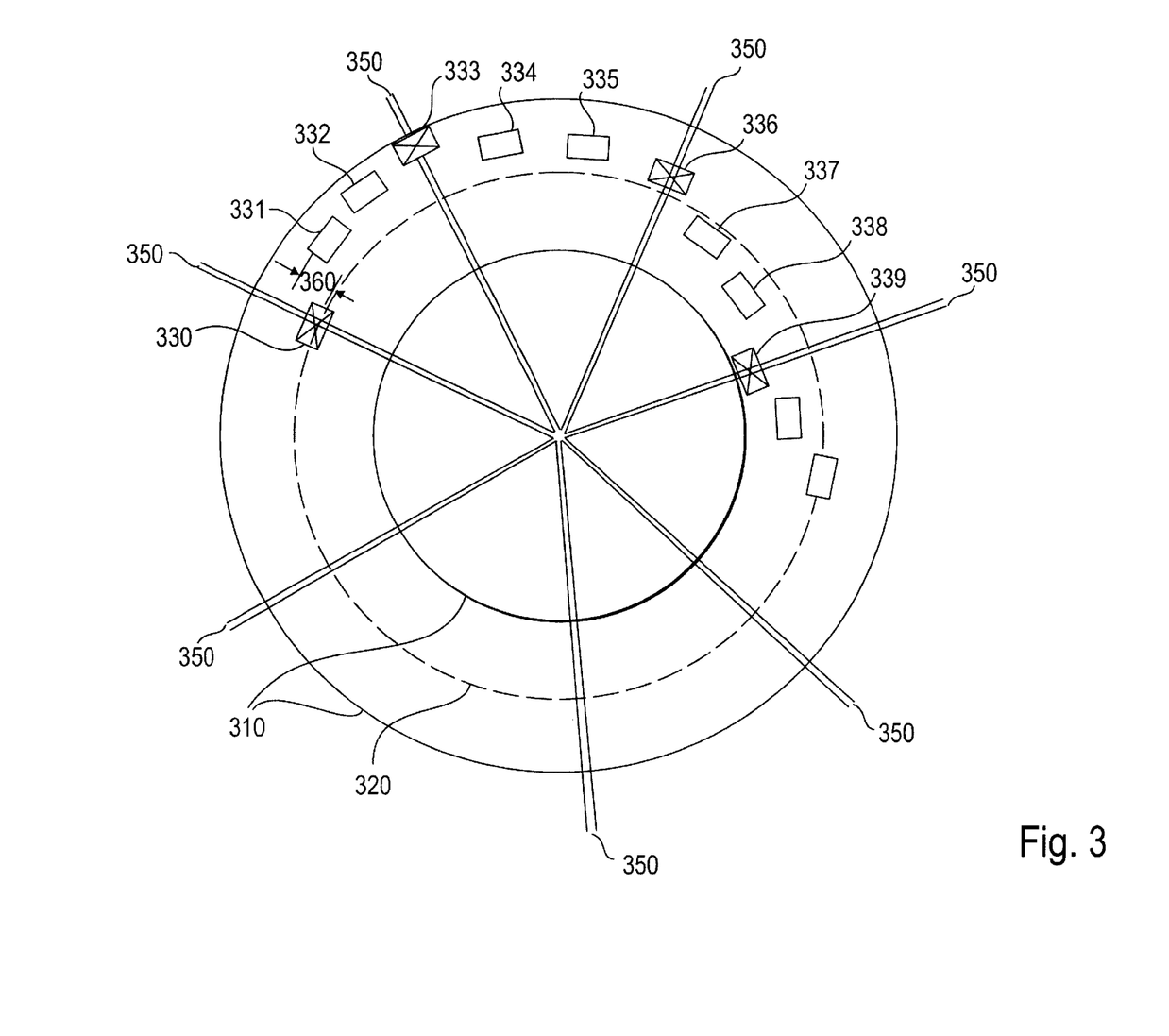
FIG. 3 illustrates an example of servo error, or positioning error on a rotating media storage device.

FIG. 3 illustrates an example of servo error, or positioning error on a rotating media storage device, for example a disk drive. It should be noted that servo error occurs on other media storage devices and that the example of a rotating media storage device such as a disk drive is merely meant to be illustrative and not limiting. It should also be noted that the systems described herein exchange the information on the servo error or positioning error as signals and thus the discussions herein may refer to the servo error or positioning error as the servo error signal or positioning error signal (PES), respectively.

Illustrated in FIG. 3 is an enlarged version of a "track" 310 on a storage disk. In approximately the center of track 310 is a dashed line 320 which represents the data stored on track 310. Actuator head 330 is illustrated in FIG. 3 as being located directly above the center of track 310 where the data 320 is stored and is also located on a servo wedge 350.

A servo wedge is like a "marking" on a disk (usually placed there at the time of manufacture) that delineates position on a disk. For example, a servo wedge in a magnetic recording media has a stronger magnetic field than other regions of the magnetic disk so as to delineate position. In the magnetic disk example, when a system senses the stronger magnetic field (i.e., the actuator head passes over a servo wedge) the position of the actuator head can be measured (or "sampled") by the system. Based upon the signal detected at the servo wedge the position of the actuator head within the track can also be determined. In other words, the system is able to detect if the actuator head is on the center of the track or is off the center of the track. If the actuator head is off center, the system will also be able to determine which direction from center and by approximately how much the actuator head is off center. When a servo wedge passes under the actuator head, this occurrence is referred to as a "servo burst".

It should be noted that the only time the position of the actuator head can be measured is at the point of a servo burst, and such measurements are referred to herein as "sampled data". Based upon the sampled data the system can determine the position error (PES) of the actuator head.

In FIG. 3, servo bursts are represented as squares having an "x" thereon. The actuator head during read and/or write does not necessarily remain directly above the stored data 320 but instead fluctuates. For example, the path of the actuator head (positions 330–339) in FIG. 3 is illustrated as having an almost sinusoidal function as the head follows the track 310. It should be noted that the path of the actuator head may vary from system to system and that the path illustrated in FIG. 3 is meant merely to be illustrative and not limiting.

When the actuator head is not at the center of the track there is a positioning error 360 (servo error) that represents the distance the head is from the center of the track. This servo error 360 contributes to read channel errors. The further the actuator head is from the center of the track the greater the chance for error in reading and/or writing the stored data. As the servo error becomes larger, the ability of these prior art media storage systems to accurately read the data diminishes, and the BER increases. Additionally, as track pitch is reduced, and bits are packed more closely on the track, BER increases due to the combined effects of servo position error and intersymbol interference.

In other words, although seemingly unrelated, the servo error control system has a direct impact on the read-channel signal processing system of a media storage system. This is due to the fact that the read-channel model used for data processing is greatly influenced by the servo error. In particular, the magnetic or optical signal generated by the actuator head as it passes over the location of the data becomes weaker as the servo error becomes larger. Thus, the servo error plays a major role in the process of read-channel equalization, where the effects of the read-channel on the measured signals are removed or equalized before a decision is made about the value of the data (detected symbols).

However, most media storage systems have a separate design for the servo control system from the read-channel signal processing system. Without linking the two together, the read signal equalizer does not have access to the valuable information about head position which would enable the equalizer to improve the BER.

Because the prior art read-channel signal processing systems do not take into account the servo error there are several disadvantages. One disadvantage is the fact that in order to ensure that the BER on such read-channel systems will remain within pre-specified bounds, the performance requirements on the servo control loop become unnecessarily conservative, leading to increased data access times and decreased track density.

Another disadvantage is that, due to servo control limitations, the power in the servo error signal cannot be arbitrarily reduced. Since all the power from the servo error signal is perceived as noise in these prior art read-channel equalizers, the performance of the read-channel equalizers in terms of the BER is unnecessarily low. Consequently, this leads to lower linear bit density on the track.

What is needed is a method and/or system that integrates servo error estimation with read-channel equalization to improve the linear bit density and track density of a media storage system.

SUMMARY OF THE INVENTION

A method and system for servo error integration in read-channel equalization are described. Servo error is integrated into a read-channel equalizer.

Other features and advantages of the present invention will be apparent from the accompanying drawings, and from the detailed description, which follow below.

DETAILED DESCRIPTION OF THE INVENTION

A method and system for servo estimation for read channel equalization is described. The present invention is capable of improving the read channel equalization through incorporation of knowledge of the structure of servo error.

The present invention may be integrated into a single software package that allows a media storage system designer to quickly and easily generate a design for read channel equalization that incorporates servo error estimation. A decision-making or advising module may also be integrated into the software package, thus augmenting the present invention. When implemented in this manner, the present invention may be carried out in an automated way, using little or no information from the user.

The present invention may also be integrated into a procedure that could be manually executed by a media storage system designer. When implemented in this fashion, the present invention may employ the user's knowledge to obtain better performance and/or shorter design time for a system employing servo error estimation in read channel equalization.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention. It is to be understood that other embodiments may be utilized and that logical, mechanical, electrical and other changes may be made without departing from the scope of the present invention.

Some portions of the detailed description that follows are presented in terms of algorithms and symbolic representations of operations on data bits within a computer system. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities may take the form of electrical or magnetic signals or other qualities of a system that are capable of being stored, transferred, combined, compared, measured, and otherwise manipulated. It has proven convenient at times, principally for reasons of common usage, to refer to these signals as bits, values, elements, symbols, characters, terms, numbers, variables, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of rotating media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

The present invention is a method and system for improved read-channel equalization in a media storage system by integration of the knowledge of the servo error in the read-channel signal processing system. In other words, the present invention uses the knowledge of the actuator head position in a media storage system to improve read-channel equalization and improve the overall linear bit density and track density of the media storage system. In some embodiments, the present invention also constructs the knowledge of the actuator head position and servo error that is used in the read-channel equalization process.

Data/media storage systems such as hard disk drives (HDDs), compact disks (CDs and CD-ROMs), digital video disks (DVDs), magneto-optical disks,. etc., read and/or write data using magnetic or optical transfer techniques. The positioning and motion of the magnetic or optical heads (actuator heads) that read and/or write the data are controlled using sophisticated feedforward and feedback control methods (control methods).

The main objective of these control methods is to minimize the servo error and improve the data access time of the system. The servo error is the error between the actual position of the head and the desired position of the head on the media storage device. The data access time is the amount of time that passes from the moment the command for reading and/or writing the data is issued to the moment that the data is actually read and/or written.

As stated in the background of the invention, most media storage systems have a separate design for the servo control system from the read-channel signal processing system. Without linking the two together, the read-channel signal processing system does not have access to the valuable information about head position which would enable the read-channel equalizer to improve the linear bit density and track density.

In the present invention, integration of the servo error information into the read-channel signal processing system improves the read-channel equalization in a media storage system and reduces the linear bit density and track density of the system as a whole. There are several embodiments of the present invention and as such there may be several combinations of embodiments that may make up a particular system.

In general the present invention uses a model (or models) that incorporates servo error and other disturbances (such as white noise used in the prior art models) to represent the sampled data derived at the servo burst locations of the media storage system. These models are then used to build an estimator of the head position error in between the servo bursts where the data is read at much higher rates, i.e., inter-sample head position errors or inter-sample data. Using the models and estimator for head position error, the most likely head position error can then be determined.

With knowledge (or estimate) of the head position error, an equalizer can be constructed that adapts to the different values of the head position error as well as the additive white noise discussed previously. In one embodiment, an equalizer is set up that divides the servo error into regularly spaced segments in terms of the head position and then equalizer coefficients are assigned to each segment based upon the particular segments distance from the center of the track. Once the equalizer coefficients are set up the read-channel equalizer performs equalization based upon the white noise and the equalization coefficients determined by the estimated inter-sample head position error. These concepts will be described in greater detail below.

Although particular examples and embodiments are used throughout this description to describe and illustrate the invention, these particular examples and embodiments are not meant to be limiting on the present invention and one with ordinary skill in the art having read this description will understand that other examples and embodiments may also be used.

It should be noted that the concepts of modeling, estimation, and system identification are known in the art and thus are not discussed in detail herein so as not to obscure the present invention. It should also be noted that various techniques for performing and building models, estimators, and system identification trajectories are also known in the art and that various combinations of these concepts and techniques may be used to practice the present invention. For examples of these concepts and techniques see: U.S. Pat. No. 5,991,525 titled "A Method for Real-Time Nonlinear System State Estimation and Control," issued Nov. 23, 1999, and assigned to the assignee herein; U.S. Pat. No. 6,041,172 titled "Multiple-Scale Signal Processing and Control System," issued Mar. 21, 2000, and assigned to the assignee herein; U.S. Pat. No. 5,880,959 titled "Method for Computer-Aided Design of a Product or Process," issued Mar. 9, 1999, and assigned to the assignee herein;

U.S. Pat. No. 6,195,594 titled "Real-Time Planner for Design," issued Feb. 27, 2001, and assigned to the assignee herein; U.S. Pat. No. 6,278,898 titled "Model Error Bounds for Identification of Stochastic Models for Control Design," issued Aug. 21, 2001, and assigned to the assignee herein; U.S. Pat. No. 6,230,062 titled "Adaptation to Unmeasured Variables," issued May 8, 2001, and assigned to the assignee herein; and U.S. patent application Ser. No. 09/522,372 titled "Method for Automated System Identification of Linear Systems," filed Mar. 10, 2000, still pending, and assigned to the assignee herein.

Figure 4:
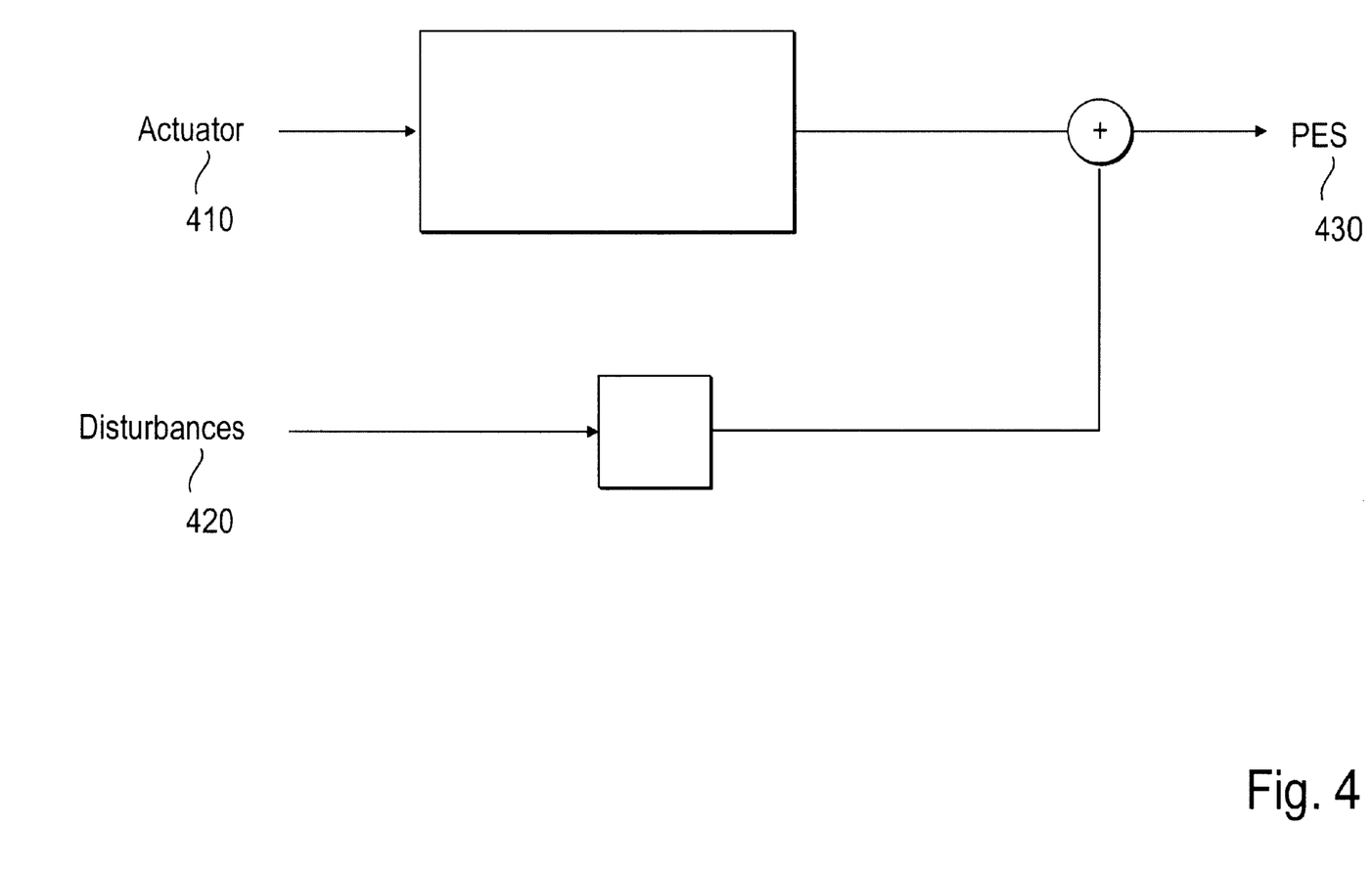
FIG. 4 illustrates an example of a model for estimating the sampling positions of the actuator head in a media storage system.

One embodiment of the present invention models dependence of channel characteristics on the inter-sample off-track head position error, $x_{PES}(t)$. The actuator head position in a media storage system is known at some predetermined times which are given by the servo bursts. The sampling instances for head position error measurement in this embodiment are synchronized to the times when servo bursts pass under the actuator head. FIG. 4 illustrates an example of a model for estimating the sampling positions of the actuator head in a media storage system. The actuator signal 410 and other disturbances of the system 420 are modeled and combined in order to produce an estimate of the position error signal (PES) 430 for the particular media storage system. The disturbances of the system 420 may be resonances, mechanical disturbances, heat generation, and other disturbances associated with media storage systems and their operating environment. Such disturbances may or may not be measurable using conventional techniques.

Knowledge of what is occurring at the time of the servo bursts is important. However, knowledge of the change in the actuator head position in between the servo bursts will give the read-channel signal processor the most valuable information in order to improve the equalization process. The present invention uses system identification techniques to identify the pattern (the disturbance spectra) of the position error signal (PES) for the particular media storage system.

The present invention treats the effect of PES of the media storage system on the read-channel signal as predictable, not just as white noise as was done in the prior art. For example in rotating media storage systems the repeatable runout (RRO) component of PES will repeat the same pattern each time around the disk. Thus, the inter-sample PES is predictable form past PES and actuator measurements to a high degree. The present invention then uses the predictable nature of the PES determined using system identification to build an estimator based upon the samples at the servo bursts and the interpolation of the actuator head position between those samples (inter-sample head position).

The inter-sample head position estimator is constructed using sampled measurements of the actuator head position, $x_{PES}(t_k)$ where k is an integer, and commanded actuator input, $u_{Actuator}(t_k)$. The estimator estimates the inter-sample head position, $\hat{x}_{PES}(t)$, i.e., estimates the position of the actuator head in the areas between the servo bursts, creating a predictable pattern for the servo error of the media storage system.

In order to build an accurate estimate of inter-sample head position, it is necessary to use an accurate model of the resonances in the input-output behavior and the disturbance behavior for the particular media storage system being used. It is also necessary to accurately estimate the repeatable run-out (RRO) harmonics for the particular media storage system being used. In general, the closed-loop spectra for media storage systems have significant power in the low frequency region. Therefore, it is possible to build an excellent estimate of the inter-sample actuator head position from the servo burst sampled data.

Using the inter-sample head position estimator it is possible to then predict what the PES is going to be at particular points in time. In other words, the system is able to predict how the actuator head veers away from the center of the track at each point along the way. Even though the system may not be able to eliminate the position error the system will be able to predict what the error will likely be and then compensate for the error at equalization. Incorporating the servo error into the equalizer rather than just taking into consideration the "white noise" of the system improves the overall results of the equalization process and will reduce the Bit Error Rate (BER) of the system.

Once the actuator head position estimator is built then an equalizer that takes the actuator head position and servo error into account can be constructed. Conventional equalizers interpret the information from the read signal and try to reduce the probability of error in detection. The equalizer reduces the probability of error in the read signal adaptively by looking at the read channel and bringing the signals to the new power levels. Because of the effects of noise in the model of FIG. 6, this involves more thatn just a change in the gain of the system. Using the concepts of the present invention an equalizer can be built that uses the head position error to amplify the power of the read channel signals such that the read signals are equalized and the detection errors are reduced.

One such example of an equalizer may have segments with equalizer coefficients that are based upon the head position. The equalizer coefficients may be adaptively updated based upon the estimated actuator head positions from the inter-sample head position estimator. The equalizer may have a single table of equalizer coefficients for different fixed head positions. The equalizer may also have multiple tables of equalizer coefficients for the different segments of the track. The number of equalizer tables will most commonly depend upon the complexity of the media storage system.

Figure 5:
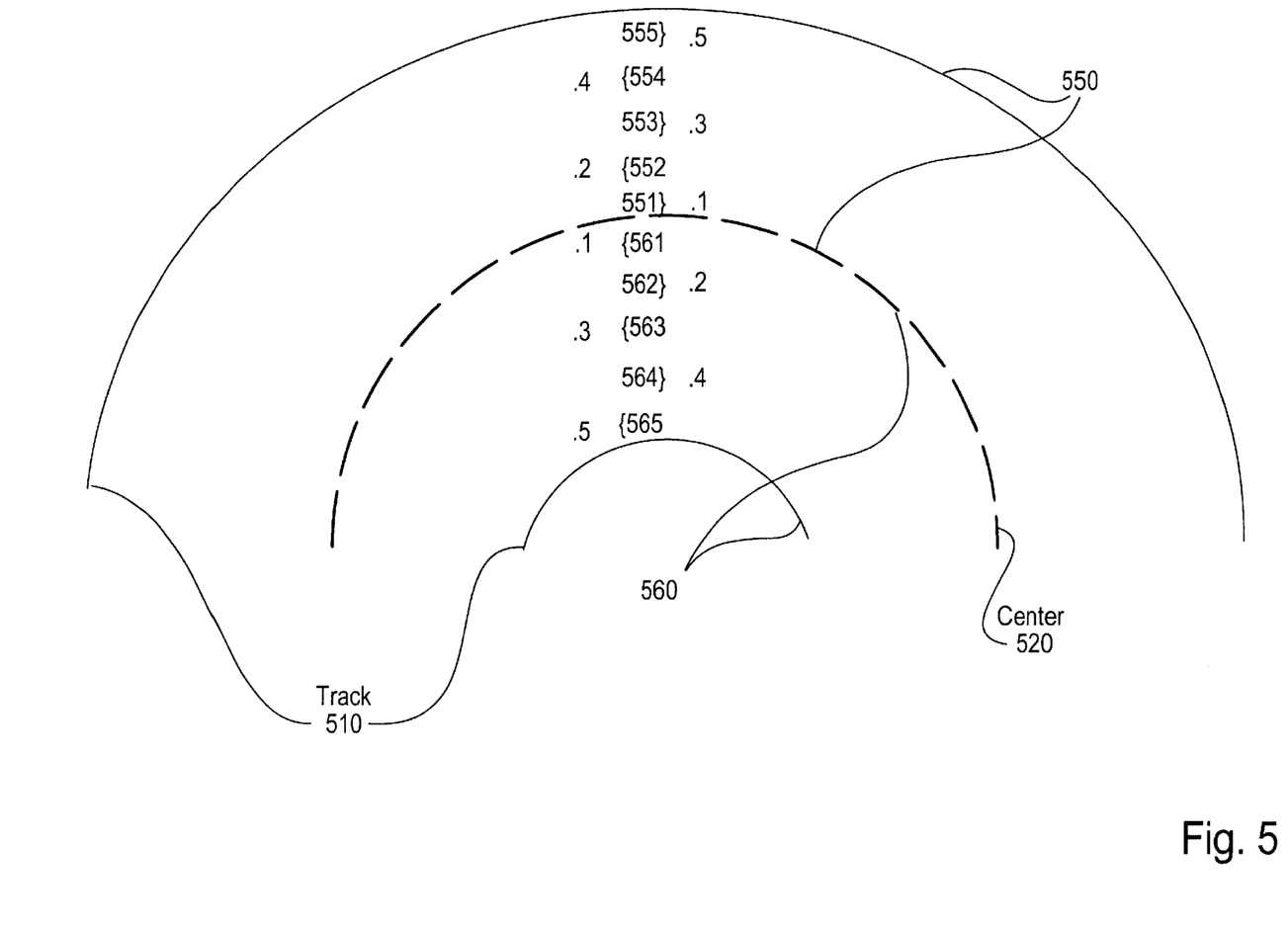
FIG. 5 illustrates an example of how equalizer coefficients may define the segments of the actuator head position error of a rotating media storage system.

FIG. 5 illustrates an example of how equalizer coefficients may define the segments of the actuator head position error of a rotating media storage system. In the example of FIG. 5, track 510 is divided into approximately ten (10) segments spaced at regular intervals from the center of the track 520. For purposes of this illustration the segments are divided into outer error coefficients 550 and inner error coefficients 560. The equalizer coefficients represent the distance the particular segment is from the center of the track 520 and the multiple of the coefficient increases as the distance from the center of the track increases. In the example illustrated in FIG. 5 the outer error coefficients 550 correspond to segments 551–555 and increase in multiples from 0.1 to 0.5, respectively and inner error coefficients 560 correspond to segments 561–565 and increase in multiples from 0.1 to 0.5, respectively. As the head position changes the equalizer coefficients are updated and thus the read-channel equalizer compensates for the PES. It should be noted that this is merely one example of how equalizer coefficients may be set up and is used merely for demonstrative purposes. One with ordinary skill in the art would understand that other conventional techniques for constructing an equalizer may also be used in conjunction with the present invention.

Figure 6:
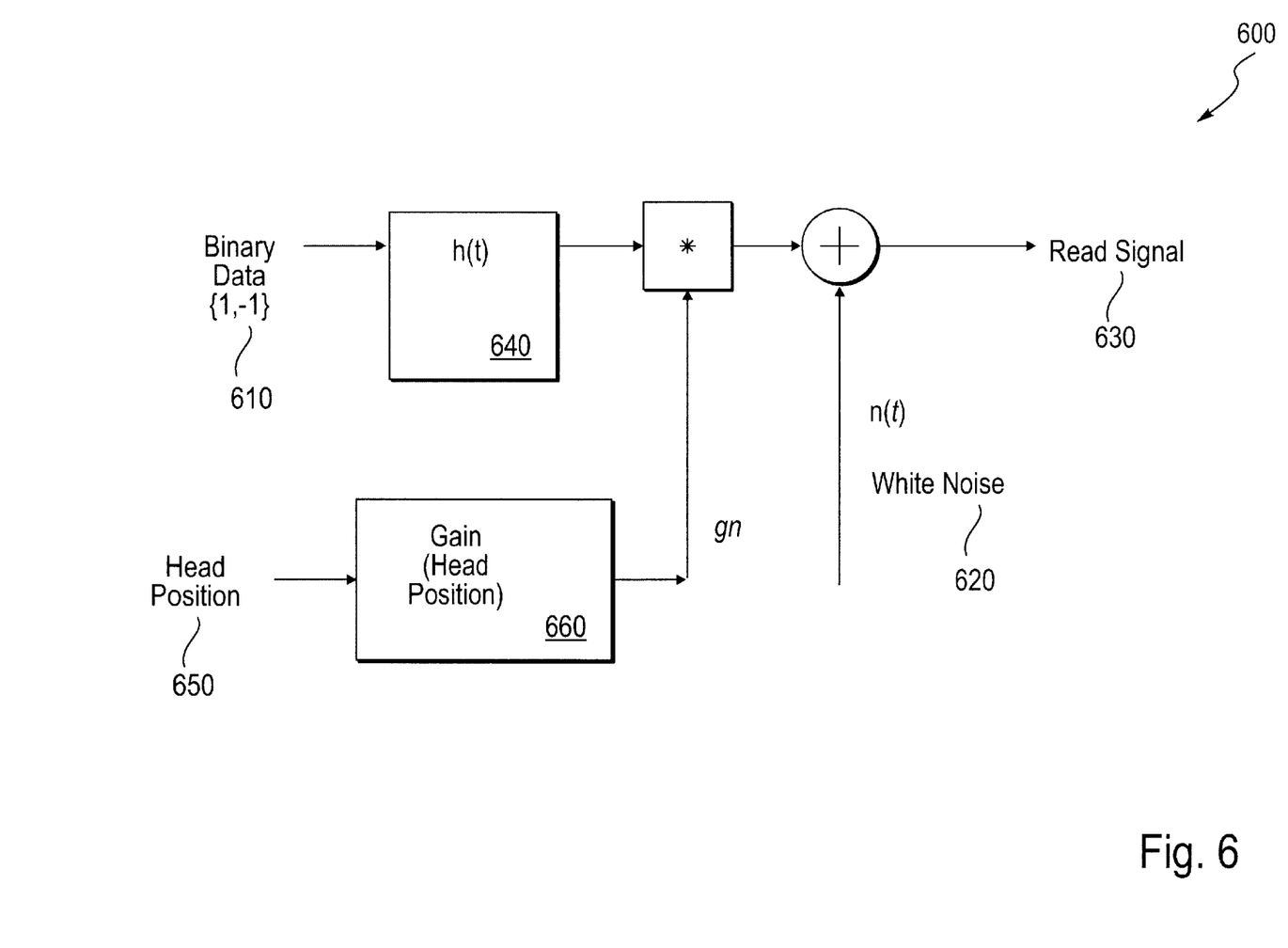
FIG. 6 illustrates an example of one embodiment of a model for a read-channel processing system that takes into account the actuator head position in addition to white noise according to the concepts of the present invention.

FIG. 6 illustrates an example of one embodiment of a model for a read-channel processing system that takes into account the actuator head position in addition to white noise according to the concepts of the present invention. Read-channel model 600 models the dependence of read-channel and noise on head position. In the embodiment illustrated in FIG. 6, model 600 represents the assumption that the read signal 630 is produced by passing the binary data 610 through a linear filter 640 and is subject to a gain of the head position 660 in addition to the additive white noise 620. In one embodiment of the present invention the power of the additive white noise and gain from the head position are formulated as $\sigma_{noise}(t)=G_2(x_{PES}(t))$ and $gn=G_1(x_{PES}(t))$, where $\sigma_{noise}(t)$ is the variance of the noise with respect to time and varies as a function of the head position error signal at time, t, and gn is the gain of the media storage system as a function of the head position error signal at time, t.

Figure 7:
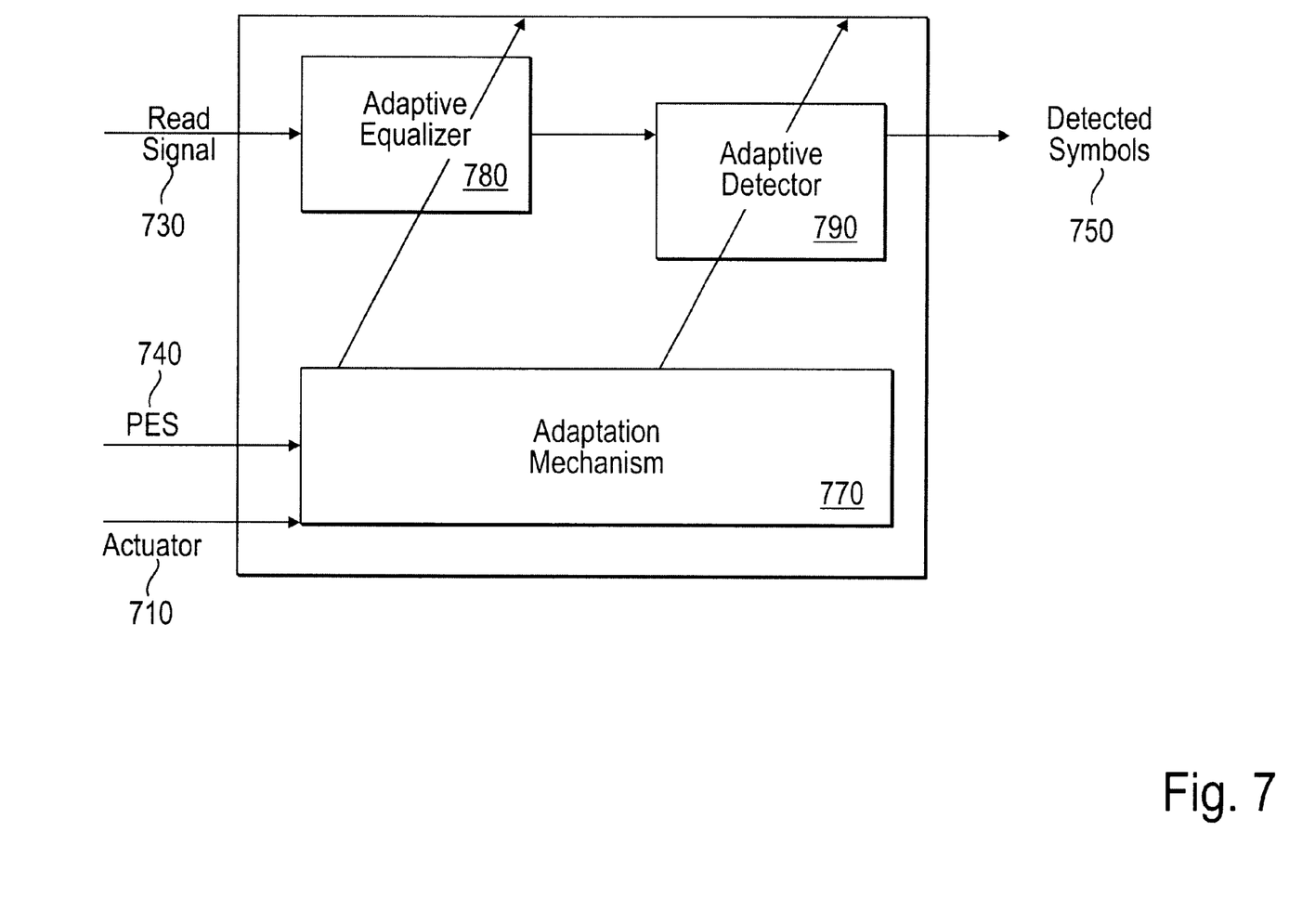
FIG. 7 illustrates the structure of one embodiment of an integrated read-channel and servo adaptation system that performs servo integrated detection according to the principles of the present invention.

FIG. 7 illustrates the structure of one embodiment of an integrated read-channel and servo adaptation system 700 that performs servo integrated equalization according to the principles of the present invention. Adaptation mechanism 770 uses the position error signal (PES) 740 and actuator signal 710 to update (or modify) the adaptive equalizer 780 and adaptive detector 790 to improve the accuracy of the detected symbols 750 from the read signal 730.

Other embodiments of the present invention include a more general structure for the manner in which the servo signals enter the read-channel model. For example, in one alternative embodiment the integrated read-channel and servo signal processing system incorporates Adaptive Decision Feedback Equalization (DFE) with the adaptation mechanism using the servo data. In another alternative embodiment the integrated read-channel and servo signal processing system incorporates the use of the servo data in the adaptation of Fixed-Delay Tree Search/Decision Feedback (FDTS/DF). Although these alternative embodiments are not described in detail herein, one with ordinary skill in the art would be able to apply the concepts of the present invention to such embodiments without undue experimentation.

Thus, a method and system for servo error integration in read-channel equalization have been described. Although specific embodiments, including specific equipment, parameters, methods, and procedures have been described, various modifications to the disclosed embodiments will be apparent to one of ordinary skill in the art upon reading this disclosure. Therefore, it is to be understood that such embodiments are merely illustrative of and not restrictive on the broad invention and that this invention is not limited to the specific embodiments shown and described.

I claim:

1. A computer readable medium containing executable instructions which, when executed in a processing system, cause said system to perform a method comprising:

integrating a servo positioning error into a read-channel equalizer.

2. A method comprising:

estimating a servo positioning error; and integrating the servo positioning error into a read-channel equalizer.

3. A method comprising:

estimating a servo positioning error for a media storage system; and integrating the servo positioning error into a read-channel equalizer of the media storage system.

4. The method of claim 3 wherein the servo positioning error is the positioning error of the actuator head in a rotating media storage system.

5. The method of claim 3 further comprising:

modeling a most likely actuator head position for the media storage system.

6. The method of claim 3 wherein integrating the servo positioning error into a read channel equalizer comprises:

equalizing a read signal based upon the estimated servo positioning error; and equalizing the read signal based upon an additive white noise.

7. A computer readable medium containing executable instructions which, when executed in a processing system, cause said system to perform a method comprising:

estimating a servo positioning error; and integrating the servo positioning error into a read-channel equalizer.

8. A computer readable medium containing executable instructions which, when executed in a processing system, cause said system to perform a method comprising:

estimating a servo positioning error for a media storage system; and     integrating the servo positioning error into a read-channel equalizer of the media storage system.

9. The computer readable medium of claim 8 wherein the servo positioning error is the positioning error of the actuator head in a rotating media storage system.

10. The computer readable medium of claim 8 further comprising:

modeling a most likely actuator head position for media storage system.

11. The computer readable medium of claim 8 wherein integrating the servo positioning error into a read channel equalizer comprises:

equalizing a read signal based upon the estimated servo positioning error; and     equalizing the read signal based upon an additive white noise.

* * * * *